United States Patent Office 3,477,819
Patented Nov. 11, 1969

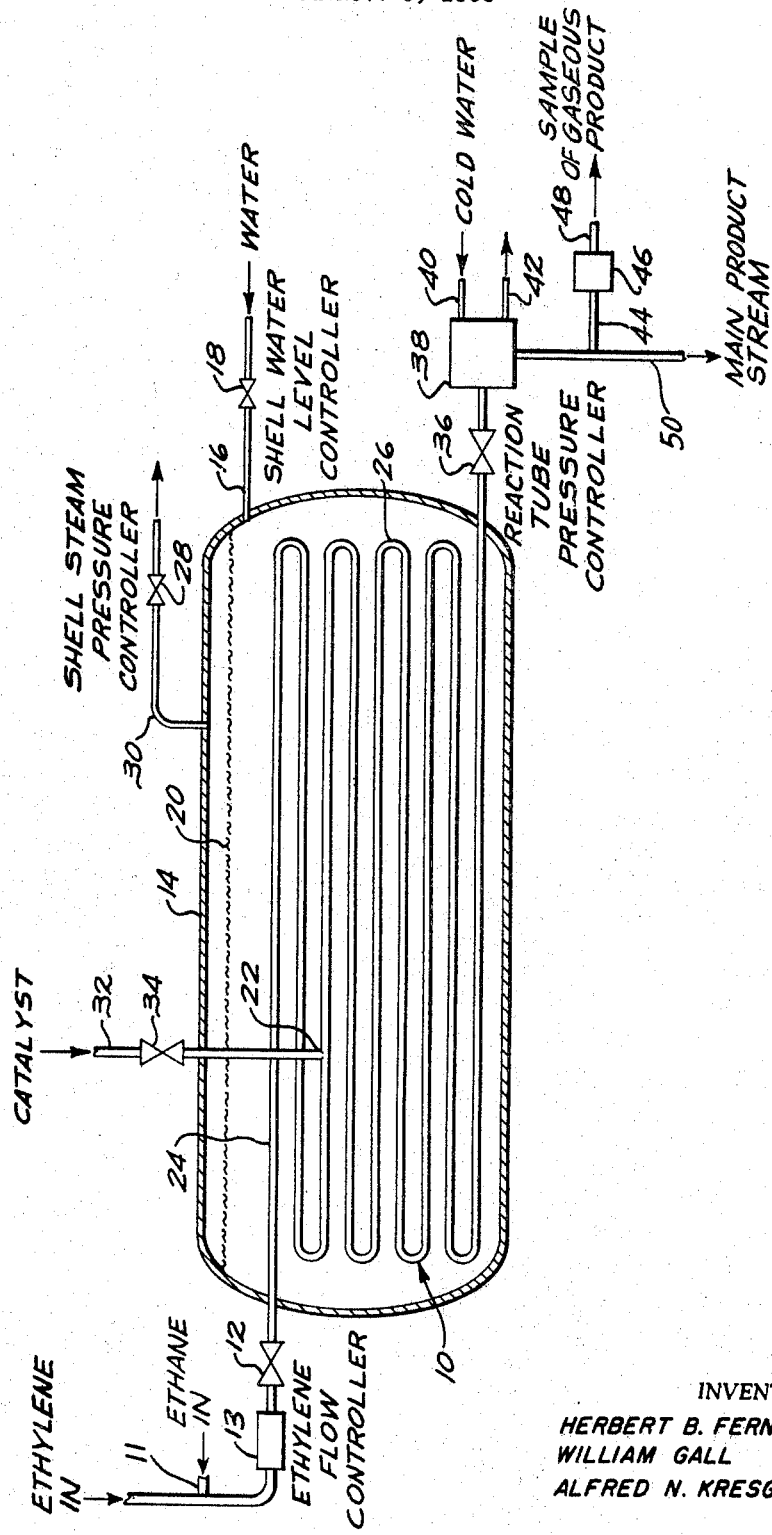

3,477,819
METHOD FOR MEASURING EXTENT OF CONVERSION IN A CHEMICAL PROCESS
Herbert B. Fernald and William Gall, Glenshaw, and Alfred N. Kresge, Verona, Pa., assignors to Gulf Research & Development Company, Pittsburgh, Pa., a corporation of Delaware
Filed Nov. 9, 1966, Ser. No. 593,072
Int. Cl. G01n 27/62, 31/08
U.S. Cl. 23—232
22 Claims

ABSTRACT OF THE DISCLOSURE

A method for determining the extent of conversion of a charge gaseous reactant stream to a product which is partially gaseous and partially liquid wherein the product contains unreacted reactant comprising employing a gaseous reactant stream containing an inert gaseous material which has substantially the same solubility in the liquid product as does the gaseous reactant and utilizing the ratio of gaseous reactant to said inert gaseous material in a sample of the gaseous phase of the effluent stream to determine extent of conversion of the gaseous reactant.

---

This invention relates to a method for determining the extent of conversion in a chemical reaction wherein the unreacted charge material and the product are difficult to separate from each other.

In certain chemical reactions, a gaseous charge is converted catalytically to a product which is at least partially liquid and partially gaseous. In order to directly determine the extent of conversion of charge to product it is necessary to substantially completely separate the unreacted gaseous charge from the gaseous and liquid product and run a material balance over the entire plant. However, it is often extremely difficult to separate the unreacted charge from the product because a portion of the product is gaseous and is therefore intermingled with the unreacted gaseous charge. Furthermore, the unreacted gaseous charge is often soluble to a considerable extent in the liquid portion of the product. Additionally, in certain chemical reactions, the liquid portion of the product contains dispersed catalyst the recovery of which must be accomplished by chemical means. For all of these reasons, it is often extremely difficult or even impossible to readily separate unreacted charge from product in order to determine the degree of conversion of the charge.

In accordance with the present invention the extent of catalytic conversion of gaseous charge to gaseous and liquid product is determined easily and quickly in a highly advantageous manner by charging together with the gaseous reactant a small proportion of a gaseous material which is highly similar to the gaseous reactant in most physical characteristics, such as percentage soluble in the liquid product, but which is totally nonreactive in the reaction environment. The ratio of inert material to charge is ascertained prior to inception of the reaction. After completion of the reaction and reduction of the temperature and pressure of the reactor effluent the ratio of the inert material and the unreacted charge is the same in both the gaseous and liquid product phases, although most of the inert material and unreacted charge is in the gaseous phase. The reason for this is that the same fraction of the total inert material will dissolve in the liquid phase as the fraction of the total reactant dissolving in the liquid phase because the inert material and reactant are so similar in physical properties. It is this similarity in physical characteristics, coupled with the fact that the inert material is not reactive in the reaction system that permits a determination of the amount of conversion of the charge without undertaking a complete separation of product from unreacted charge and a material balance.

Since substantially equal proportions of unreacted gaseous reactant and of the inert material dissolve in the liquid product, the ratio of unreacted charge to inert material dissolved in the liquid product is substantially the same as it is in the gaseous phase of the product. Therefore, if only a minor fraction of the gaseous phase of the reaction product is sampled and the ratio of unreacted charge to inert material is measured, the ratio will represent substantially the true over-all ratio of the two materials in the entire reactor effluent.

By measuring the ratio of gaseous reactant charge to inert material in a small sample of the inlet stream and by measuring the ratio of unreacted charge to inert material in a small sample of the gaseous phase of the product stream, the degree of conversion in the process is readily determined. For example, if the ratio of reactant to inert material in the charge stream is 200 to 1, and the ratio of unreacted charge to inert material in the product stream is 100 to 1, since the inert material does not react and passes through the system undisturbed, it is apparent that 100 out of 200 parts of the charge has reacted, i.e., there has been a 50 percent conversion of reactant charge to product.

An example of the present invention is the conversion of ethylene to higher molecular weight alpha olefin in the presence of an organometallic catalyst in an elongated tubular reactor. A minor proportion of ethane is charged together with ethylene to the reactor. For example, the ratio of ethylene to ethane in the charge stream is between about 10,000 and 5, generally, and between about 1,000 and 100, preferably. The ethane is highly similar to ethylene in percentage solubility in the alpha olefin liquid product but is completely nonreactive in the system.

The alpha olefins are produced by a step-wise conversion of gaseous ethylene to higher straight chain primarily liquid olefins having the double bond in the terminal or alpha position as follows:

$$CH_2=CH_2+CH_2=CH_2 \rightarrow CH_3-CH_2-CH=CH_2$$
$$CH_3-CH_2-CH=CH_2+CH_2=CH_2 \rightarrow$$
$$CH_3-CH_2-CH_2-CH_2-CH=CH_2$$

etc. This polymerization occurs catalytically in the presence of organo metallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process can be described in terms of three major reactions. In the propagation (growth) reaction, an alkyl group on an aluminum atom containing $n$ ethylene units can add an ethylene molecule to become an alkyl group of $n+1$ ethylene units, as follows:

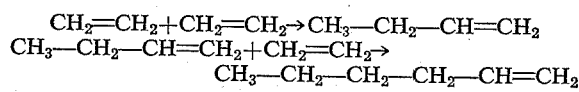

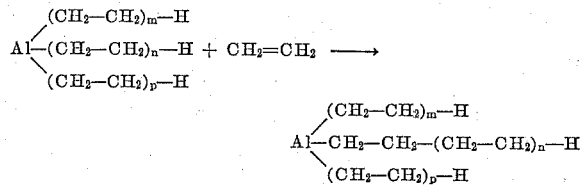

The transalkylation (displacement) reaction which occurs concurrently with the growth reaction consists of two steps. These are, first, thermal decomposition of an aluminum alkyl group to a hydride plus alpha olefin followed by a rapid reaction of the hydride with ethylene to regenerate an ethyl group which can start another growth cycle. The thermal decomposition is much slower than reaction of ethylene with a hydride and, therefore, is the rate-determining step for the over-all reaction.

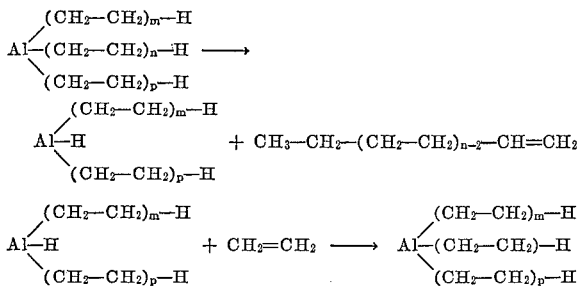

The growth and displacement reactions occur repeatedly as long as there is unreacted ethylene present. Therefore, the reaction should be afforded a very high residence time. As long as there is free ethylene in the presence of catalyst in the reactor under reaction conditions, each mole of catalyst present will produce additional normal alpha olefin product. Therefore, a long residence time is conducive to a high alpha olefin yield per mole of catalyst, i.e., a high catalyst efficiency.

The third reaction is similar to the first except that the aluminum alkyl adds a product alpha olefin, rather than ethylene, to form a branched chain aluminum alkyl group. However, this structure is very unstable and rapidly decomposes to form a hydride and an olefin of vinylidene structure.

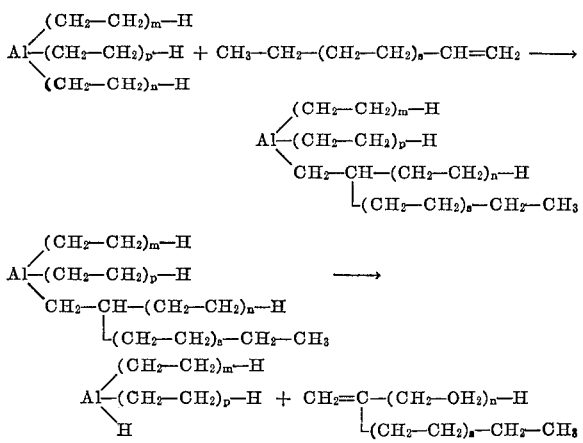

The decomposition is so rapid compared to the addition of another ethylene molecule to the branched alkyl that essentially all reactions of this type result in an olefin or vinylidene structure and regeneration of an aluminum ethyl alkyl group. As a result, there will be few, if any, alpha olefins with branching beyond the beta carbon.

Low temperature favors the growth reaction and will result in a higher average molecular weight product. At high temperatures, the average molecular weight will be lower because the transalkylation reaction predominates. The portion of $C_{12}$ alpha olefin in the product tends to remain relatively constant with temperature changes within the most preferred range of this invention, with lower temperatures favoring a relatively higher proportion of product above $C_{12}$ and higher temperatures favoring a relatively higher proportion of product below $C_{12}$.

In view of the fact that the production of normal alpha olefins is the object of the above reactions, ethylene is the sole olefin which can be employed as a reactant in the charge. The normal alpha olefins produced will have from four to about 40 carbon atoms and will be primarily liquid with practically no solid polymer produced except as an undesired by-product. The normal alpha olefins produced, particularly the $C_{12}$, $C_{14}$ and $C_{16}$ alpha olefins, have high utility for production of detergents.

The catalyst employed in the alpha olefin process can be defined by the following structural formula:

$$M'_a M_b R_c X_d$$

wherein M' is a metal selected from the alkali or alkaline earth metals and $a$ can be either 0 or one; M is a metal selected from the group consisting of aluminum, gallium, indium and beryllium and $b$ can be either 0, one or two, except that $a+b$ is at least one; R is selected from the group consisting of monovalent saturated aliphatic or alicyclic radicals, monovalent aromatic radicals or any combination thereof; X is selected from the group consisting of hydrogen and halogen. The sum of $c$ and $d$ is equal to the total valences represented by the metals, and when X is a halogen $c$ must be at least one. Examples of catalysts which can be employed include:

$Be(C_2H_5)_2$, $LiC_2H_5$, $AlH_3$, $HAl(CH_3)_2$, $H_2AlC_2H_5$, $Al(CH_3)_3$, $Al(C_2H_5)_3$, $Al(C_4H_9)_3$, $Al(C_3H_7)_3$, $Al(C_6H_5)_3$, $Ga(CH_3)_3$, $Ga(C_2H_5)_3$, $In(C_2H_5)_3$, $In(CH_3)_3$, $Be(C_6H_5)_2$, $Na(C_5H_{11})$, $Al(C_2H_5)_2Cl$, $Al(C_2H_5)Cl_2$, $Al(C_4H_9)_{1.5}Cl_{1.5}$, $Al(C_4H_9)_2Cl$, $LiAlH_4$, $NaAlH_4$, $LiAl(C_2H_5)_4$, $NaAl(C_4H_9)_4$, $Mg(AlH_4)_2$, $Zn(C_2H_5)_2$, etc.

The catalyst can be used as such, but preferably is employed with about 70 to 98 percent by weight thereof of an inert hydrocarbon solvent such as saturated aliphatics (n-pentane, isopentane, hexane, n-heptane, isooctane, n-dodecane, merusol oil, paraffinic oils, kerosene, etc.), alicyclics such as cyclohexane, cyclopentane, etc. aromatics such as benzene, toluene, etc. Since it is desired to produce a liquide alpha-olefin product rather than a relatively high molecular weight solid polymer, the catalyst should be substantially free of catalyst components other than the catalysts defined above, such as, for example, $TiCl_4$. The amount of catalyst required herein is not critical and can be from about $1\times10^{-4}$ to about $1\times10^{-2}$ mols thereof per mol of ethylene.

The temperature of the reaction can range from about 285° F. to about 615° F., generally, from about 350° F. to about 430° F., preferably, and from about 380° F. to about 400° F., most preferably. The upper range of pressure employed is not critical and can be as high as about 1000 atmospheres or even higher, but the lower pressure range, however, is critical. The pressure should be sufficiently high that most of the alpha olefin product is a liquid under reaction conditions and so that the catalyst and most of the ethylene are dissolved or dispersed in said liquid. As soon as liquid alpha olefin product is produced, the catalyst tends to entirely dissolve therein. It is important to have as high as possible a concentration of ethylene in the phase containing the catalyst, otherwise liquid olefin product rather than ethylene will tend to react with the catalyst to produce vinylidenes. Therefore, the pressure should be sufficiently high to force as much ethylene as possible into the liquid phase together with the catalyst. After there has been a conversion of 55 to 60 percent of the ethylene, there is sufficient liquid product to dissolve substantially all the ethylene and produce a single homogeneous phase in the reactor. Thus, the pressure in the reactor must at all times be at least about 1000 and preferably at least about 2000 pounds per square inch gauge.

When it is desired to terminate the reaction, the product is withdrawn from the tubular reactor, is reduced in temperature and pressure, whereupon most of the gaseous olefins are flashed off. The liquid product is then treated in any suitable manner to deactivate the catalyst and the desired product fractions are recovered. The catalyst may be deactivated, for example, by contact with sufficient acid, base, water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of organometallic compounds. In a preferred method, the aluminum catalyst is removed from the alpha olefin product by reaction with caustic solution to form $Na_2OAl_2O_3$ plus paraffin as follows:

$$2H_2O + 2NaOH + 2AlR_3 \rightarrow Na_2OAl_2O_3 + 6$$

paraffin.

It is shown in Ser. No. 153,815, filed Nov. 21, 1961, now abandoned, that the amount of the desired normal alpha olefin in the product is always greater when the polymerization reaction is carried out in a tubular or coil reactor rather than in a single continuous stirred autoclave or series of stirred autoclaves for a given total conversion of ethylene to some kind of polymer. That application explains that in order to achieve high selectivity toward normal alpha olefins the reactants and product should flow substantially as a column through the tube whereby there is a minimum of backmixing so that the percentage of normal alpha olefin product increases throughout the length of the reactor. Since a given molecule of aluminum alkyl catalyst can undergo growth and transalkylation reactions repeatedly, it is important that ethylene charge and catalyst be permitted a high residence time in order to achieve a high catalyst efficiency, i.e., the production of a large amount of normal alpha olefins per mole of aluminum alkyl catalyst charged. A high residence time and avoidance of backmixing is most conveniently achieved by utilizing a very long tubular reactor.

The drawing shows a single tubular reactor system wherein ethylene is charged to a very long tubular reactor 10 through a flow control valve 12. A side stream of ethane gas is bled into the ethylene stream through line 11 and the ratio of ethylene reactant to inert ethane gas is measured in a chromatograph 13. Tubular reactor 10 is disposed substantially entirely within outer shell 14. Cooling water is charged to shell 14 through line 16. Level control valve 18 maintains a constant water level 20 within the shell which completely submerges reactor 10. A relatively small stream of alkylaluminum catalyst, such as triethyl aluminum, dissolved in a suitable sovent is pumped by positive displacement action to an intermediate point 22 in coil 10 through line 32 and valve 34 so that the region 24 of said coil upstream from point 22 serves as an ethylene preheat zone wherein the ethylene is heated prior to inception of the reaction and the region 26 of said coil downstream from point 22 serves as a reaction zone. Point 22 is chosen as the position in the reactor tube for starting the reaction because it is essentially the point in said reactor coil closest to the inlet end wherein the ethylene is substantially effectively preheated to reaction temperature. Regulation of stream pressure within shell 14 by means of steam pressure control valve 28 in line 30 establishes the temperature of the boiling water throughout shell 14 and maintains a uniform reactor temperature substantially throughout the length of reaction zone 26 of the coil 10. Reaction zone effluent comprising predominantly normal alpha olefins, unreacted ethylene, and catalyst is discharged through reactor pressure control valve 36, whereat the pressure is reduced to between about 50 and 1000 pounds per square inch gauge, and is then discharged through cooling chamber 38 whereat product temperature is reduced to the lowest practical temperature while still maintaining the product in a liquid state, i.e., to about 150° F. by means of water charged through the line 40 and removed through line 42. Finally, the main product stream which is at a temperature and pressure at which the reaction is substantially terminated is discharged through line 50 to a caustic treatment chamber, not shown, for removing the catalyst from the desired normal alpha olefin product by reacting the aluminum with caustic to produce sodium aluminate and paraffins. A small sample of the gaseous phase of the product stream is passed through line 44 to chromatograph 46 and line 48. Chromatograph 46 measures the ratio of ethylene to ethane in the product stream.

In order to achieve the highest conversion of ethylene to normal alpha olefin per mole of catalyst used the length of the reactor is made as long as possible and is only limited by practical and economic size restrictions in outer shell 14 which encloses the reactor tube, and by pressure drop. For example, tube 10 can comprise between about 500 and 10,000 feet of about one to four-inch pipe. There are a number of reasons for utilizing a very long tubular reactor. First, a very long tubular reactor permits excellent heat transfer for removal of heat of reaction. Secondly, it advantageously reduces backmixing for the reason explained above. Thirdly, a long reactor length permits achievement of a high catalyst efficiency because of additional conversion per mole of catalyst. Finally, a long reactor length tends to minimize the percentage of paraffin in the alpha olefin product. The final reason is based upon separation of the alkyl aluminum catalyst by treatment with caustic wherein the alkyl components of the catalyst are converted to paraffins which have boiling points close to those of the most desired alpha olefin components of the product and are therefore difficult to remove from the desired normal alpha olefins. Since the absolute amount of paraffins produced is fixed by the quantity of catalyst used, the greater the quantity of alpha olefins produced with said catalyst the smaller will be the percentage of paraffins in the product.

The steam pressure in shell 14 is maintained at about between 50 and 500 pounds per square inch, generally, and at about between 140 and 340 pounds per square inch, preferably. The reactants in reaction zone 26 are generally at a temperature only about 3° F. to 10° F. above the bath temperature. As noted above, the reaction temperature not only affects the degree of conversion of ethylene but, more importantly, it also establishes the molecular weight distribution of the alpha olefin product. Since relatively low reaction temperatures favor conversion to relatively high molecular weight product it is important to preheat the ethylene to within about 5° F. to 10° F., generally, and 3° F. to 6° F., preferably, of the coolant bath temperature prior to catalyst addition. It is believed that the relatively high molecular weight alpha olefins produced at low reaction temperatures grow into polymers which can foul the downstream region of the reactor tube and thereby increase the frequency of periodic reactor down time due to fouling because of polymer formation. For this reason, it is important not to add catalyst to the reactor tube until the ethylene has been preheated to within a least 10° F. of full reaction temperature.

Finally, the reactor tube should not be so long that more than about 75 weight percent, generally, or more than about 60 weight percent, preferably, of the ethylene is converted to product. The reason is that at high conversion levels, there arises excessive competition between olefin product and ethylene in the growth reaction, whereby conversion to vinylidene compounds becomes excessive. In order to minimize vinylidene production total conversion of ethylene in the reactor is advantageously limited to the range of 50 to 65 weight percent.

The pressure in the tubular reactor should be sufficiently high that the alpha olefin product is mostly liquid phase under reaction conditions and the ethylene and catalyst are presumably dissolved or dispersed in said liquid. As stated above, the pressure in the reactor tube should be at least about 1000 pounds per square inch gauge. The pressure drop through the tube is advantageously limited to between about 5 and 300 pounds per square inch.

The product following termination of the reaction by reduction of the temperature and pressure of the effluent stream comprises a liquid phase and a gaseous phase. The general composition of each phase follows:

Gaseous phase:
 Unreacted ethylene
 Ethane
 Low molecular weight alpha olefins
Liquid phase:
 Higher molecular weight alpha olefins
 Disolved ethylene
 Dissolved ethane
 Dissolved catalyst
 Catalyst solvent The mixture of ethylene and ethane is charged to the reactor independently of and in advance of the catalyst charge. A sample comprising a minor proportion of the ethylene and ethane charge mixture is analyzed in a chromatograph and the ratio of ethylene to ethane in the charge stream is determined.

A sample comprising a minor proportion of the gaseous phase of the product stream is also analyzed in the same or a different chromatograph and the ratio of ethylene to ethane in the product stream is determined. The increased proportion of the totally nonreactive ethane in the product as compared to the charge is a direct indication of the amount of ethylene converted in the process. For example, a 300 to 1 ratio of ethylene to ethane in the charge stream as compared to a 100 to 1 ratio of ethylene to ethane in the product stream indicates that two-thirds of the ethylene charge has been converted to alpha olefin in the process.

Under some process conditions, calculations to measure changes in ethylene conversion based upon changes in ethane concentration in the gaseous phase of the product stream will give fairly comparable results as compared to calculations based upon changes in the ratio of ethylene to ethane in said gaseous phase. Under these conditions, for purposes of calculation measurement of ethane concentration in the gaseous phase of the product stream can be substituted for measurement of the ratio of ethylene to ethane in said phase. Similarly, under some process conditions a knowledge of changes in concentration of ethane in the charge stream is fairly comparable for purposes of calculation of changes in ethylene conversion to a knowledge of changes in the ratio of ethylene to ethane in the charge stream. Furthermore, if the concentration of ethane in the charge remains substantially constant, even in the absence of calculation merely observing changes in ethane concentration in the gaseous phase of the product stream will by itself indicate changes in ethylene conversion. For example, with a constant charge ethane concentration a reduction of ethane concentration in the product gaseous phase can indicate an increase in liquid alpha olefin yield because an increase in liquid yield causes increased dissolution of ethane from the gaseous to the liquid phase.

Various changes and modifications can be made without departing from the spirit of this invention or the scope thereof as defined in the following claims.

We claim:

1. A method for determining the extent of conversion of a charge gaseous reactant stream to a product which is partially gaseous and partially liquid wherein the product contains unreacted reactant comprising employing a gaseous reactant stream containing an inert gaseous material, said inert gaseous material being nonreactive in the system and said inert gaseous material having substantially the same solubility in said liquid product as does the gaseous reactant, measuring the ratio of gaseous reactant to said inert gaseous material in a sample of the gaseous phase of the effluent stream and comparing said ratio to the ratio of gaseous reactant to said inert gaseous material in the charge stream to determine the extent of conversion of said gaseous reactant.

2. The method of claim 1 wherein the gaseous reactant is soluble in the liquid product.

3. The method of claim 1 including the step of measuring the ratio of gaseous reactant to inert gaseous material in a sample of the charge stream.

4. The method of claim 1 wherein said gaseous reactant is ethylene and said inert gaseous material is ethane.

5. The method of claim 4 wherein said liquid product is alpha olefin.

6. A method for determining the extent of conversion of a gaseous reactant stream to a product which is at least partially liquid and contains unreacted reactant comprising charging a gaseous reactant stream containing an inert gaseous material, said inert gaseous material being nonrective in the system and said inert gaseous material having substantially the same solubility in the liquid product as the gaseous reactant, measuring the ratio of gaseous reactant to said inert gaseous material in said gaseous reactant stream prior to inception of the reaction, measuring the ratio of gaseous reactant to said inert gaseous material in a sample of the gaseous phase of the effluent stream, and comparing said ratios to determine the extent of conversion of said gaseous reactant.

7. The method of claim 6 wherein said gaseous reactant is ethylene and said gaseous inert material is ethane.

8. The method of claim 6 wherein each of said ratios is measured in a chromatograph.

9. A method for determining the extent of conversion of ethylene to an alpha olefin product which is at least partially liquid and which contains unreacted ethylene comprising charging ethane together with ethylene to a reactor, measuring the ratio of ethane to ethylene in the charge stream prior to inception of the reaction, charging organometallic catalyst to said reactor to convert ethylene to an alpha olefin product which contains ethane and unreacted ethylene, measuring the ratio of ethane to unreacted ethylene in said product, and comparing said ratios to determine the extent of conversion of said ethylene.

10. A method for determining the extent of catalytic conversion of ethylene to product comprising liquid and gaseous alpha olefins, said product containing unreacted ethylene and catalyst, comprising charging ethane together with ethylene to a reactor, said ethane being inert in the system and having substantially the same solubility in the liquid product as does the ethylene, measuring the ratio of ethane to ethylene prior to inception of the reaction, adding organometallic catalyst to said reactor to convert said ethylene to alpha olefin product, obtaining a product stream comprising a gaseous and a liquid phase substantially upon completion of the reaction, obtaining a sample of the gaseous phase of the product, measuring the ratio of ethane to ethylene in said product sample, and comparing to ethane to ethylene ratio in the product to the ethane to ethylene ratio in the charge to determine the extent of conversion of ethylene in the system.

11. The mehod of claim 10 wherein the reaction occurs in an elongated tubular reactor.

12. The method of claim 10 wherein said organometallic catalyst is triethylaluminum.

13. The method of claim 10 wherein said ratios are measured in a chromatograph.

14. The method of claim 10 wherein the product liquid phase comprises alpha olefin, dissolved ethylene, dissolved ethane, and dissolved catalyst while the product gaseous phase comprises unreacted ethylene, ethane and lower molecular weight alpha olefin.

15. The method of claim 10 wherein the temperature and pressure of the reaction product is reduced prior to obtaining a sample of the gaseous phase of the product.

16. A method for determining a change in conversion of a charge gaseous reactant stream to a product which is partially gaseous and partially liquid wherein the product contains unreacted reactant comprising employing a gaseous reactant stream containing an inert gaseous material, said inert gaseous material being nonreactive in the system and said inert gaseous material having substantially the same solubility in said liquid product as does the gaseous reactant, and measuring the concentration of said inert material in a sample of the gaseous phase of the effluent stream to determine a change in conversion of said gaseous reactant.

17. A method for determining changes in conversion of ethylene to an alpha olefin product which is at least partially liquid and which contains unreacted ethylene comprising charging ethane together with ethylene to a reactor, charging organometallic catalyst to said reactor to convert ethylene to an alpha olefin product which contains ethane and unreacted ethylene, and measuring the concentration of ethane in said product to determine changes in conversion of said ethylene.

18. A method for determining changes in catalytic conversion of ethylene to a product comprising liquid and gaseous alpha olefins, said product containing unreacted ethylene and catalyst, comprising charging ethane together with ethylene to a reactor, said ethane being inert in the system and having substantially the same solubility in the liquid product as does the ethylene, adding organometallic catalyst to said reactor to convert said ethylene to alpha olefin product, obtaining a product stream comprising a gaseous and a liquid phase substantially upon completion of the reaction, obtaining a sample of the gaseous phase of the product, and measuring the concentration of ethane in said product sample to determine changes in the extent of conversion of ethylene in the system.

19. A method for determining the extent of conversion of a charge gaseous reactant stream to product which is partially gaseous and partially liquid wherein the product contains unreacted reactant comprising employing a gaseous reactant stream containing an inert gaseous material, said inert gaseous material being nonreactive in the system and said inert gaseous material having substantially the same solubility in said liquid product as does the gaseous reactant, measuring the concentration of said inert matreial or the ratio of gaseous reactant to said inert gaseous material in a sample of the gaseous phase of the effluent stream and comparing said effluent stream measurement to the concentration of said inert gaseous material or the ratio of gaseous reactant to said inert gaseous material in the charge stream to determine the extent of conversion of said gaseous reactant.

20. A method for determining the extent of conversion of a gaseous reactant stream to a product which is at least partially liquid and contains unreacted reactant comprising charging a gaseous reactant stream containing an inert gaseous material, said inert gaseous material being nonreactive in the system and said inert gaseous material having substantially the same solubility in the liquid product as does the gaseous reactant, determining the concentration of said inert gaseous material or the ratio of gaseous reactant to said inert gaseous material in said gaseous reactant stream prior to inception of the reaction, measuring the concentration of said inert gaseous material or the ratio of gaseous reactant to said inert gaseous material in a sample of the gaseous phase of the effluent stream, and comparing said reactant and effluent stream values to determine the extent of conversion of said gaseous reactant.

21. A method for determining the extent of conversion of ethylene to an alpha olefin product which is at least partially liquid and which contains unreacted ethylene comprising charging ethane together with ethylene to a reactor, determining the concentration of ethane or the ratio of ethane to ethylene in the charge stream prior to inception of the reaction, charging organometallic catalyst to said reactor to convert ethylene to an alpha olefin product which contains ethane and unreacted ethylene, measuring the concentration of ethane or the ratio of ethane to unreacted ethylene in said product, and comparing said charge and product values to determine the extent of conversion of said ethylene.

22. A method for determining the extent of catalytic conversion of ethylene to a product comprising liquid and gaseous alpha olefins, said product containing unreacted ethylene and catalyst, comprising charging ethane together with ethylene to a reactor, said ethane being inert in the system and having substantially the same solubility in the liquid product as does the ethylene, determining the concentration of ethane or the ratio of ethane to ethylene prior to inception of the reaction, adding organometallic catalyst to said reactor to convert said ethylene to alpha olefin product, obtaining a product stream comprising a gaseous and a liquid phase substantially upon completion of the reaction, obtaining a sample of the gaseous phase of the product, mesauring the concentration of ethane or the ratio of ethane to ethylene in said product sample, and comparing said product and charge stream values to determine the extent of conversion of ethylene in the system.

References Cited

UNITED STATES PATENTS

| 3,013,004 | 12/1961 | Koble et al. | 23—253 XR |
| 3,130,187 | 4/1964 | Tolin et al. | |
| 3,230,154 | 1/1966 | Walker | 23—230 XR |

OTHER REFERENCES

Waler et al., Principles of Chemical Engineering, (1927), pp. 23–24. Scientific Library TP–155–W3.

MORRIS O. WOLK, Primary Examiner

R. E. SERWIN, Assistant Examiner

U.S. Cl. X.R.

23—230; 260—94.9